(12) United States Patent
Dittrich et al.

(10) Patent No.: US 7,238,895 B2
(45) Date of Patent: Jul. 3, 2007

(54) MULTI-PURPOSE DIGITAL SCALE FOR TRAVELERS

(76) Inventors: Josephine M. Dittrich, 60 Main St., Apt. 3, Andes, NY (US) 13731; Andre A. Muelenaer, Jr., 6736 Mallard Lake Dr., Roanoke, VA (US) 24018

( * ) Notice: Subject to any disclaimer, the term of this patent is extended or adjusted under 35 U.S.C. 154(b) by 0 days.

(21) Appl. No.: 11/511,784

(22) Filed: Aug. 29, 2006

(65) Prior Publication Data
US 2007/0045011 A1 Mar. 1, 2007

Related U.S. Application Data

(60) Provisional application No. 60/711,926, filed on Aug. 29, 2005.

(51) Int. Cl.
G01G 19/56 (2006.01)
A45C 13/00 (2006.01)
G01B 3/12 (2006.01)

(52) U.S. Cl. .................... 177/126; 177/148; 33/775
(58) Field of Classification Search ............... 33/775; 177/126, 131, 148, 149, 245
See application file for complete search history.

(56) References Cited

U.S. PATENT DOCUMENTS

| | | | | |
|---|---|---|---|---|
| 2,518,973 A | * | 8/1950 | Atherton | 190/102 |
| 2,710,083 A | * | 6/1955 | White | 190/102 |
| 2,759,577 A | * | 8/1956 | White | 190/102 |
| 2,937,016 A | * | 5/1960 | Westman | 177/156 |
| 3,090,454 A | * | 5/1963 | Farrar et al. | 177/131 |
| 5,065,830 A | * | 11/1991 | Stevenson | 177/263 |
| 5,121,328 A | * | 6/1992 | Sakai et al. | 705/407 |
| 6,649,849 B2 | * | 11/2003 | Bass et al. | 177/25.15 |
| 7,084,357 B2 | * | 8/2006 | Roberts et al. | 177/131 |
| 2005/0217904 A1 | * | 10/2005 | Hughes | |
| 2005/0224261 A1 | * | 10/2005 | Marks | |
| 2006/0054364 A1 | * | 3/2006 | Kamakau | |
| 2006/0065448 A1 | * | 3/2006 | Hudson | |
| 2006/0131082 A1 | | 6/2006 | Shai | |
| 2006/0207850 A1 | * | 9/2006 | Lewis | |
| 2007/0007048 A1 | * | 1/2007 | Gill | |

* cited by examiner

*Primary Examiner*—Randy W. Gibson
(74) *Attorney, Agent, or Firm*—Jeffrey K. Seto

(57) ABSTRACT

A portable scale that allows travelers to calculate the weight of their luggage and compare the weight against weight limits that are imposed by common carriers. The scale includes circuitry for calculating weight and a memory for storing weight limits. Weight and other information is shown to the user via a display screen. In the preferred embodiment, the scale includes a hook and handle that facilitate weighing suitcases and other objects. The preferred embodiment also includes a digital measuring tape that allows the traveler to check the size of his luggage against size restrictions imposed by common carriers. The scale can also be incorporated into a portable weighing mat, which allows weight to be determined simple by placing the object on the mat. The scale can also be incorporated into the handle of a suitcase wherein the weight of the suitcase is calculated when the suitcase is lifted by its handle.

7 Claims, 6 Drawing Sheets

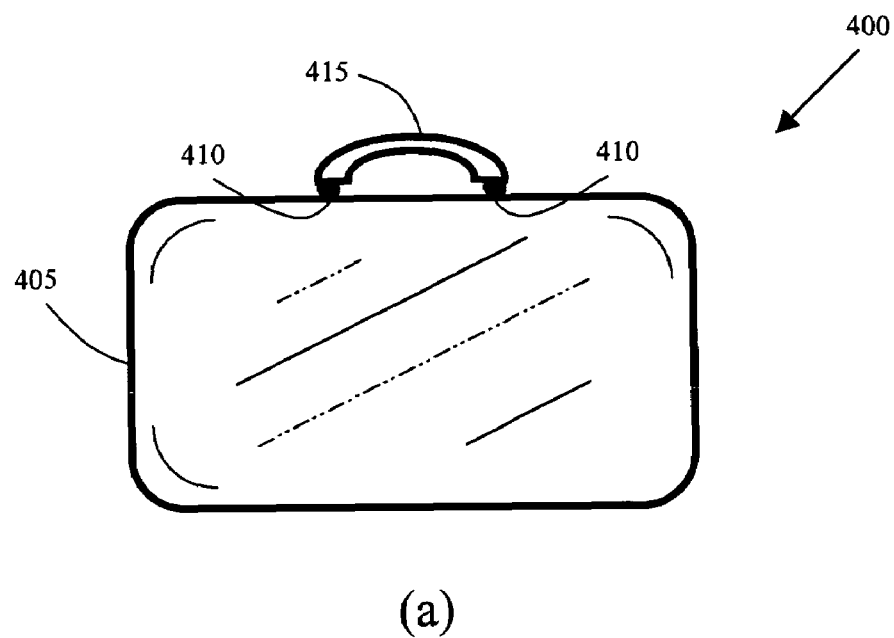
(a)
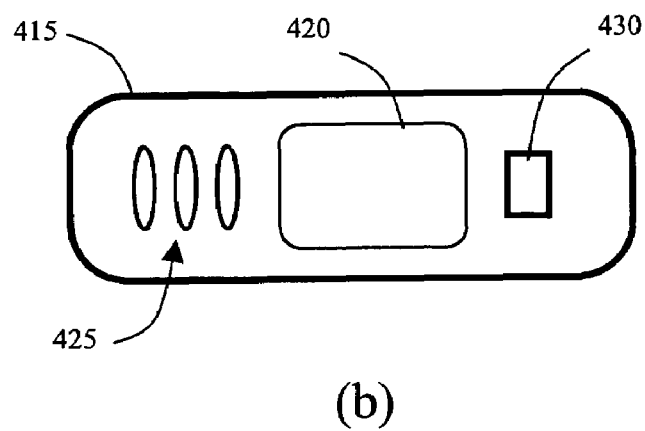
(b)
Figures 4(a) & (b)

MULTI-PURPOSE DIGITAL SCALE FOR TRAVELERS

BACKGROUND OF THE INVENTION

The subject of this application was initially disclosed in U.S. provisional patent application No. 60/711,926, filed on Aug. 29, 2005, and priority is claimed to the provisional application.

The present invention relates generally to the field of weighing devices and more specifically to a handheld scale that is adapted to weigh portable items, such as luggage and baby carriers.

Airlines today are trying to save money in every way possible. One way that airlines, and other carriers, are able to reduce their overhead costs is to limit the amount (weight) of luggage that passengers bring with them. The most efficient way to enforce this limit is to set a total weight limitation for all bags that accompany each passenger. A well-known U.S. airline limits each passenger to a total of 70 lbs of luggage, or other bags, for each flight. If a passenger's luggage weighs more than 70 lbs, the passenger must pay an additional fee, or surcharge, to have their bags checked and carried. Many common carriers publish, including on the Internet, their weight limits so passengers can plan accordingly.

A problem with luggage weight arises when the passenger is flying on more than one airline and the different airlines have different weight limits for passenger luggage. This weight problem is exacerbated when the passenger is flying on a foreign carrier, as the passenger can almost always count on a different weight limit and most U.S. travelers do not have easy access to foreign weight limits.

Digital scales are well-known in the field. Miniaturized circuits are used to convert a physical measurement (weight) into a digital signal and subsequently display the weight, in number of lbs (pounds) or kg (kilograms), on a display screen.

A computer application is a program that is stored and executed on at least one computer that aids a user in achieving one or more useful tasks. When a user needs to run an application that is stored on a remote computer, the user can download an "applet", or portion of the application, to his computer. The applet allows the user's computer to access and run the required application that is stored on the remote computer.

SUMMARY OF THE INVENTION

A portable, multi-function scale for weighing suitcases and other objects that allows travelers to calculate separate and total weights of their luggage prior to traveling. The scale also allows travelers to compare their calculated weights to weight limits imposed by multiple common carriers, including airlines. The scale comprises electronic circuitry, a display screen, at least one control button, means for communicating with another electronic device and at least one battery. The scale's electronic circuitry provides for storing and processing weight and size information. The circuitry also allows for sending and receiving weight and size information. The display screen and the at least one control button allow the user to select a desired operation and have the results displayed for the user's viewing. The means for communicating with another electronic device allows for digital connection to a computer, which in the preferred embodiment has Internet access. The at least one battery provide electrical power to the circuits of the scale.

The multi-function scale may further comprise an easy to grip handle that is rotate-ably attached to one side of the scale. The scale's handle includes a hook that is mechanically attached to the handle. The hook is adapted to fit under and through a suitcase handle thereby allowing the suitcase to be picked up and weighed, via the hook and easy to grip handle of the scale. The hook preferably includes at least one hinge that allows the hook to be folded lengthwise so the scale can achieve a compact size for storage.

The multi-function scale may also include a measuring wheel that is rotate-ably attached to the scale. The measuring wheel is able to roll along a length of the suitcase to determine distance information. The measuring wheel is electrically connected to the electronic circuitry and is able to send the distance information to the electronic circuitry for processing and display to the user.

The means for communicating with another electronic device is preferably a communications port that is adapted to accept a communications cable, such as a USB cable. However, the means for communicating may also be a wireless transceiver that provides for wireless communications with a computer.

The multi-function scale with handle attachment may advantageously be used with an "S" shaped hook that allows the weight of the object being weighed to be supported by a door or a table. The top portion of the "S" shaped hook is adapted to be hung over the door or table, and a bottom of the "S" shaped hook accepts and supports the handle portion of the scale.

It is an object of the present invention to indicate to travelers when their luggage will exceed the weight or size limitation of a carrier, such as an airline, on which they will be traveling.

It is a further object of the invention to provide a scale that also serves as a database of weight and size limitations imposed by common carriers.

It is yet another object of the present invention to provide a multi-function scale that can be used as a stand-alone model, in combination with the handle, and that can be incorporated into objects, such as the handle of a suitcase, to provide additional functions to the suitcase.

BRIEF DESCRIPTION OF THE DRAWINGS

The invention of the present application will be described in detail with reference to the accompanying drawing(s), given only by way of example, in which:

FIG. 4(a) is a side view of an alternate embodiment;

FIG. 4(b) is a top view of the alternate embodiment;

DETAILED DESCRIPTION OF THE INVENTION

Figure 1:
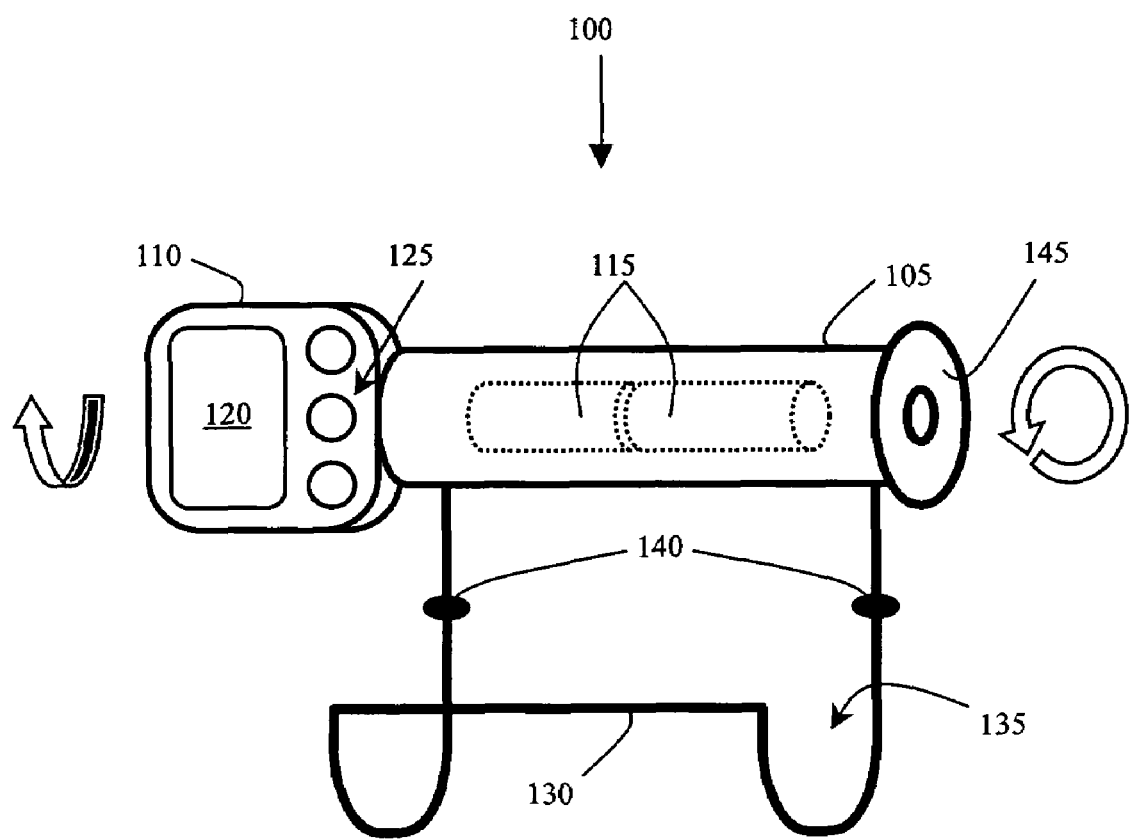
FIG. 1 is a perspective view of the preferred embodiment.

FIG. 1 shows the preferred embodiment of the present multi-purpose handheld scale 100. The preferred embodiment includes a soft or padded handle 105 and a display and control unit 110. The handle 105 includes the mechanical portion of the scale and is used to lift the scale 100 and at least one attached piece of luggage. The handle 105 also houses the batteries 115 that supply electrical power to the digital scale circuits in the control unit 110. The control unit 110 includes, electronic circuitry for processing weight and size related information, a liquid crystal display (LCD) screen 120 and multiple control buttons 125. When used without the handle 105, the control unit 110 also includes at least one battery. The LCD screen 120 displays a graphical user interface (GUI) that provides information, including weight information, to the user. In the preferred embodiment, the control buttons 125 include: an "off/on" button; a "navigation" button for navigating through different functions of the GUI; and, a "select" button for selecting a desired function. In alternative embodiments, more and less buttons can be provided and the controls may also include toggle switches and three position switches. The control unit 110 can swivel relative to the handle 105 so, no matter how the scale is being held, the user is always able to see the front of the control unit 110. The control unit 110 provides multiple functions to the user, all of which are intended to aid the user in ensuring that they are within the allowable weight limits of all carriers on which the user will be traveling. Exemplary functions include, being able to display weights in "lbs" or in "kg", and the ability to "zero" the scale. The zeroing, or tare weight, function can be selected on a menu that is displayed on the LCD screen, and can be used to determine the weight of a baby that is placed in a baby carrier, for example. First, the baby carrier's handle is placed in the luggage holder 130 of the preferred embodiment and weighed. Next, while the carrier remains in the luggage holder 130, the "zero" function is selected, and the baby is placed in the carrier. The scale 100 will then display the weight of the baby, and only the baby.

Many travelers need to find the total weight of all their bags. So, a cumulative, or "total weight", function that allows the user to keep a running total of all items weighed is also available to user. After selecting the "total weight" function on the control unit 110, the scale 100 will add the weights of all individually weighed items together and give the user a total weight for all of the items. This function is especially useful to travelers that must know the total weight of all their luggage, so they can budget for additional luggage fees, if needed. The scale 100 will continue to total the weights of weighed items until the user "deselects" the function. The luggage holder 130 at the bottom of the scale is small enough to fit under and through the carrying handle of standard suitcases. After the luggage holder 130 is through the carrying handle of the suitcase, the handle is able to rest securely in a cradle 135 that is formed by the bottom of the luggage holder 130. The luggage holder 130 is also designed to be wide enough so as to prevent unwanted swinging or swaying of the luggage, while the luggage is being weighed. When the present multi-purpose handheld scale 100 is not being used, the luggage holder 130 can be folded via hinges 140 for easy and compact storage. The preferred embodiment of the present scale also includes a digital tape measurer 145 for measuring the dimensions of a suitcase or other luggage. The digital tape measurer 145 is different from a traditional taper measurer and comprises a rotate-able wheel that can be rolled along the length of a suitcase. The measured length is calculated by the electronic circuitry in the control unit and is based on the circumference of the wheel, which is known, and the number of rotations of the wheel. The size of the luggage is displayed to the user on the display screen 120.

Figure 2:
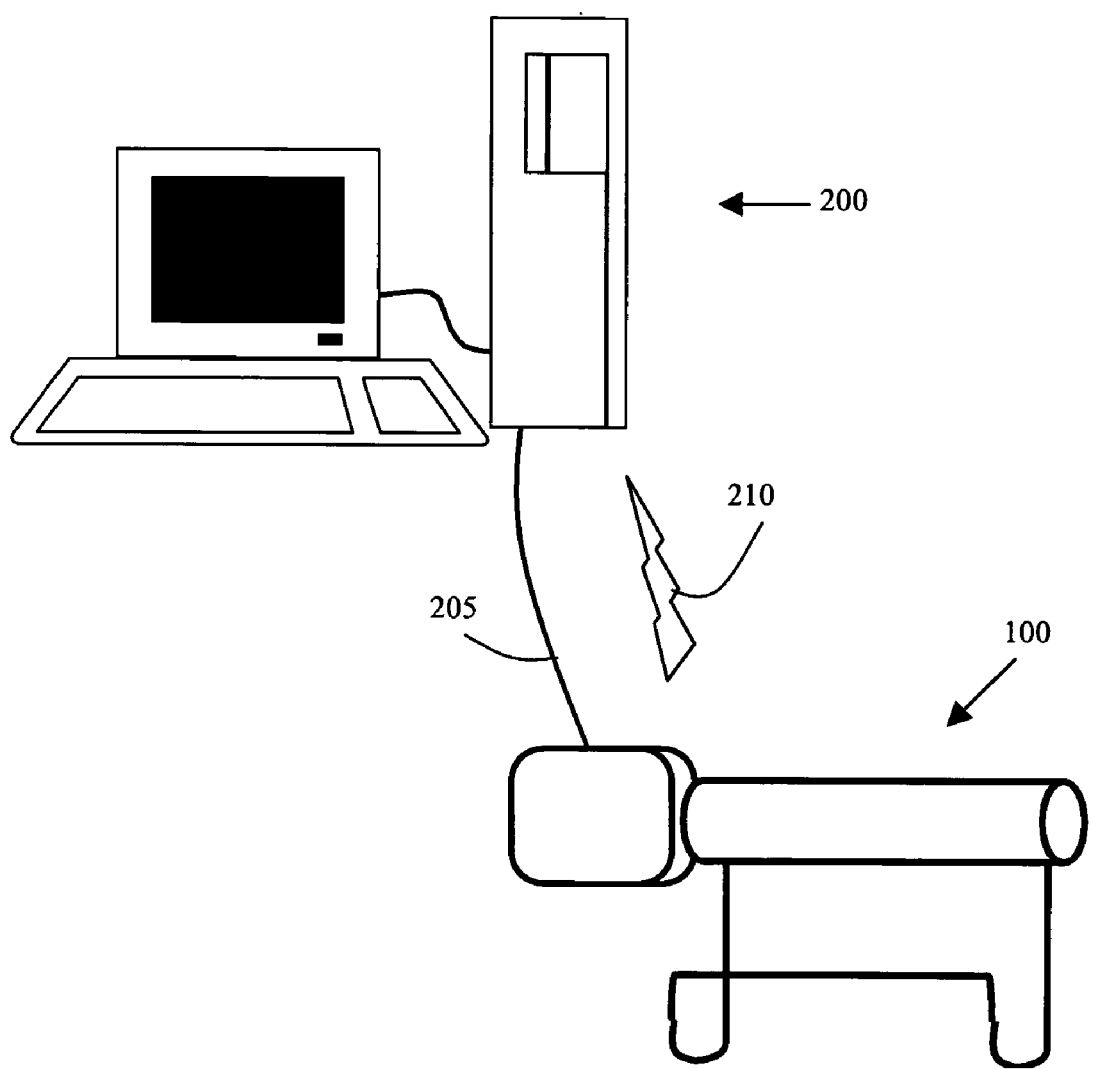
FIG. 2 shows the preferred embodiment connected to a computer.

FIG. 2 shows the preferred embodiment connected to a computer 200. The present handheld scale 100 can be connected to the computer 200 by a cable 205, or by a wireless connection 210. In the preferred embodiment, the control unit includes a Universal Serial Bus (USB) port and the cable 205 is a USB cable. However, other well-known communication cables may be used in other embodiments. In the case of a wireless connection, the control unit includes a digital transceiver that communicates wirelessly with the computer 200. Alternatively, the computer 200 can be replaced by another electronic device, including a personal digital assistant (PDA) and a cellular telephone. The only requirement being that the computer 200 or other digital device must have Internet access. While the computer 200 includes a database of common carrier weight limitations, these common carriers frequently change their weight limits, in response to rising fuel costs, for example. Further, the shear number of common carriers (airlines, buses and trains) in the U.S. and worldwide, requires that the computer 200 have Internet access so only up-to-date weight limitations are presented to the user. The computer 200 also includes a browser program for displaying webpages and a memory that stores the website address of at least one website. The preferred website includes information pertaining to weight limits of airliners and other common carriers, both in the U.S. and around the world. Of course the website can also include other helpful information, such as "size" limitations of luggage. Weight and size limit information is downloaded from the computer 200 to the scale 110 and used to indicate any luggage problems the traveler could encounter. Alternatively, weight and size information from the handheld scale 110 could be uploaded to the computer 200 and the uploaded information used to point out any potential problems with the user's selected carriers.

As mentioned above, the present invention can be used to determine the weight of a baby. One of the website addresses stored in the computer 200 can be a website that a parent uses to track their baby's weight. The website could be used to track their baby's weight against normal weights for babies of the same age. Of course, the parent would also be able to personalize the website with pictures and even videos.

Figure 3:
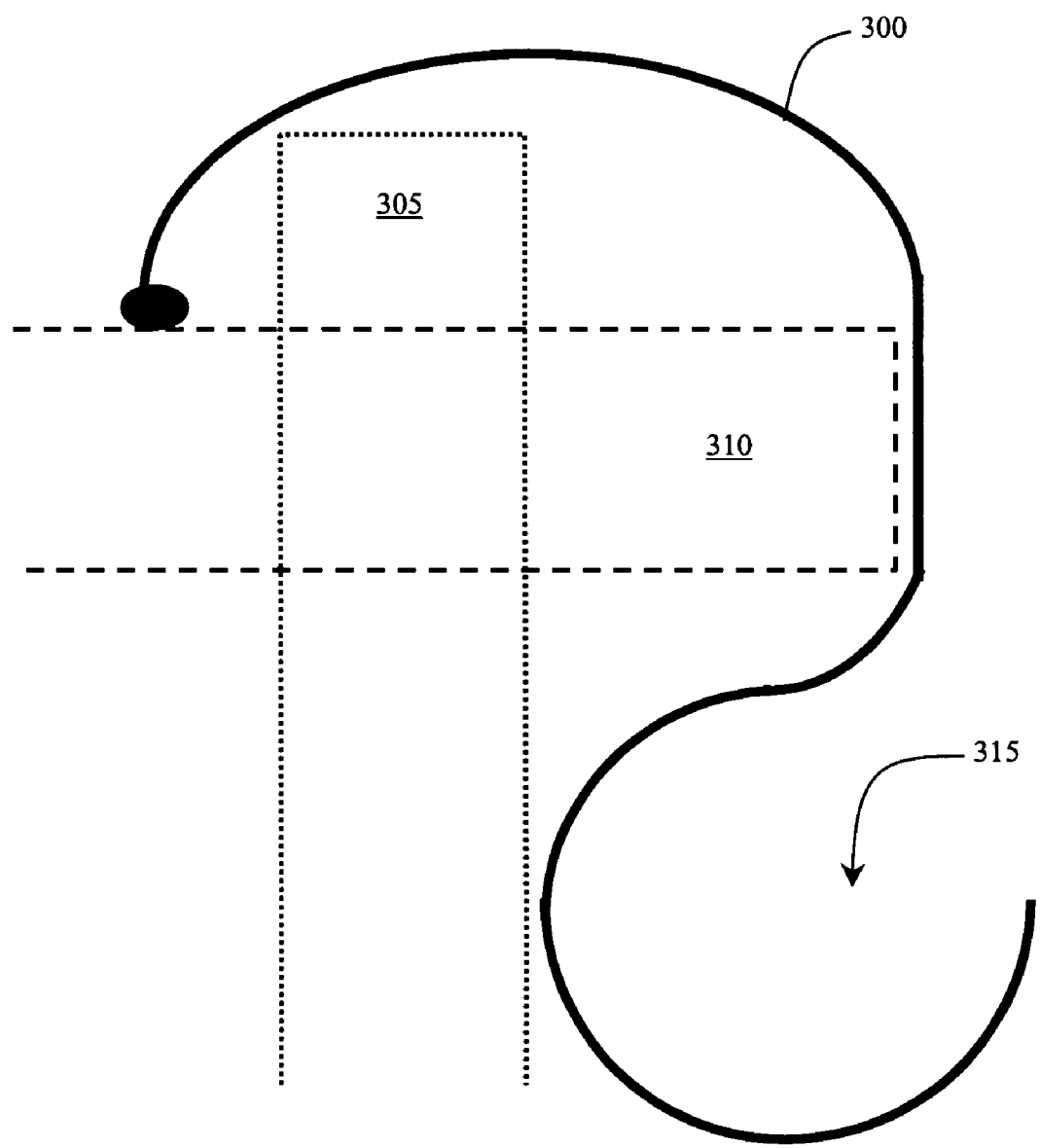
FIG. 3 is a side view of a hook accessory for the preferred embodiment.

FIG. 3 is a side view of an accessory for the handheld scale. The accessory is an "S" shaped hook 300. The hook 300 can be hooked over the top of a door 305, or over the edge of a table 310. The hook 300 is adapted to receive the handle of the present scale within the cradle 315 that has been created in the lower portion of the hook 300. This hook accessory allows the user to weigh items, including luggage and baby carriers, without having to simultaneously lift the item, and the scale. If a traveler has three bags to weigh, the present scale and hook 300 allow the traveler to weigh each bag, one at a time, and receive a total weight of all three bags at the end. The traveler can then immediately check his luggage's weight against his carrier's limitations for any problems. If the website indicates "no weight problems" then the traveler will have peace of mind in knowing that his luggage will be O.K. in his travels, no matter how many countries that may include. In the preferred embodiment, the hook 300 is approximately 3" (inches) wide and designed so as not to interfere with the loading and unloading of baggage handles on the present scale. Both, the hook 300 and the present handheld scale can preferably support luggage weighing up to 100 lbs.

FIGS. 4(a)&(b) show an alternative embodiment 400 where the present digital scale is integrated into the handle 415 of a piece of luggage 405, which allows the weight of the luggage 405 can be determined by simply picking up the piece of luggage by its handle 415. Physical measurements are taken at the couplings 410, between the handle 415 and the luggage 405, and sent to the display screen 420 for viewing by the user. The display screen 420, the control buttons 425, and the communication port 430 are all positioned on the top of the suitcase handle 415 so as not to interfere with the normal operations of the handle. In this embodiment 400, the scale, while housed within a suitcase handle, is still able to deliver multiple functions to the user, including checking weight limits imposed by common carriers, calculating tare weight, and uploading and downloading information to and from the Internet. The handle 415 also includes at least one battery, which could be rechargeable. The present digital scale could also be integrated into other parts of a suitcase in other embodiments. For example, pressure sensors could be placed in the footings of the luggage to calculate weight, and the display screen could be placed in locations other than the handle.

Figure 5:
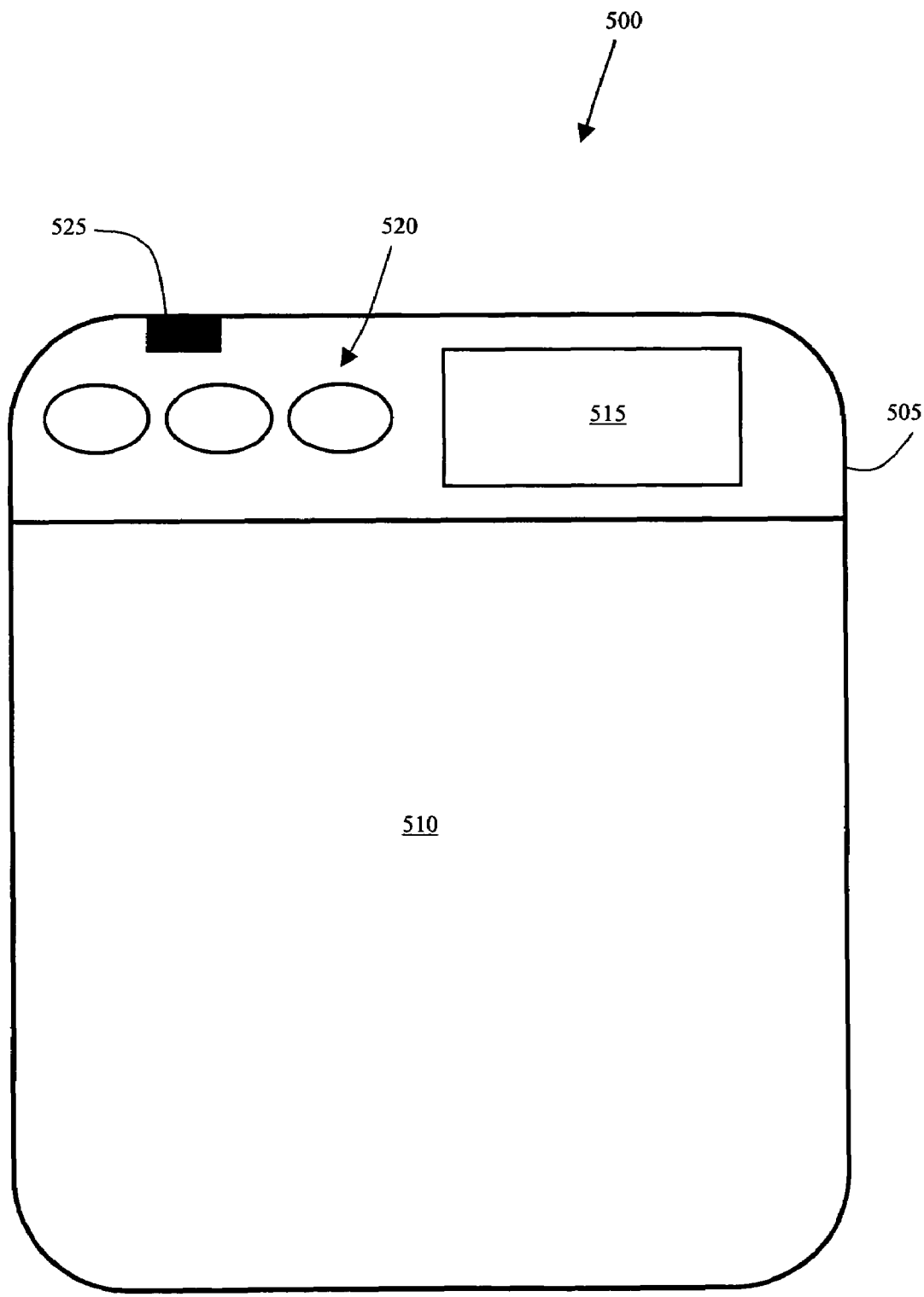
FIG. 5 is a top view of another alternate embodiment.

FIG. 5 shows another alternative embodiment 500, wherein the digital scale 505 is integrated with a pressure sensitive floor mat 510. Any luggage that is rolled onto, or placed on, the floor mat 510 can have its weight calculated by the circuitry within the scale 505 and displayed on the display screen 515. The control buttons 520 allow the user to select from a menu of functions that include totaling the weights of multiple items, checking weight and size limitations imposed by airlines and other common carriers, and uploading and downloading information to and from the Internet. The floor mat embodiment 500 could be battery powered or it could be adapted to plug into a conventional electrical outlet.

Figure 6:
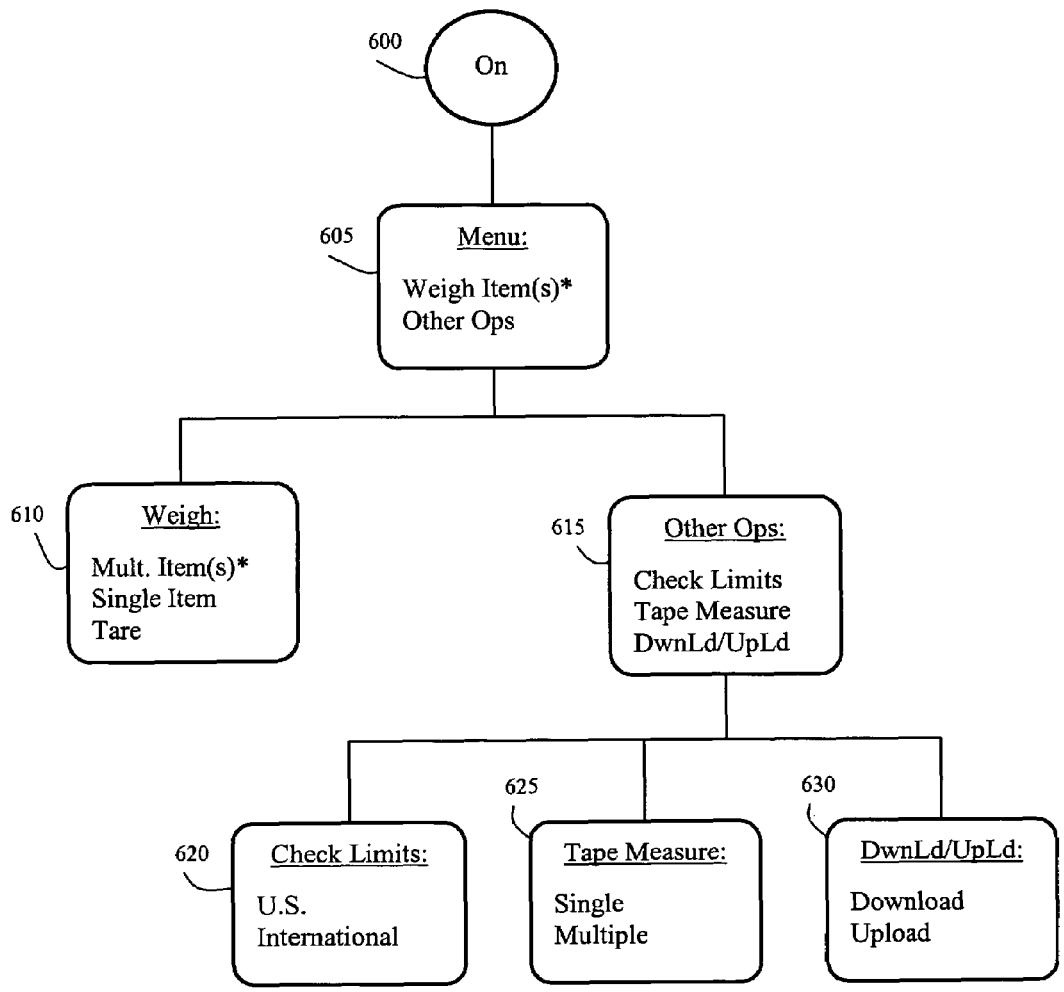
FIG. 6 is a flow chart showing the menu of functions available to the user.

FIG. 6 is a flow chart showing the steps involved in the menu that is provided for the user in the preferred embodiment. In step 600 the scale is turned "on". This can be done automatically, by simply placing an item on the hook to be weighed, or one of the control buttons can be designated as an "off/on" switch. In step 605 the user is presented with two choices, weigh something, or do something else. The use of a "*" after a menu item in the flow chart indicates the default choice for that level. In other words, if the user simply picked up the scale and started weighing things, the scale would default into the "Weigh multiple item(s)" mode. If the user selects "Weigh item(s)", then he is taken to step 610 and given the opportunity to select from a list of weighing functions including, single item, multiple items, and tare weight. If, in step 605, the user selected "Other operations" the user would have been take to step 615 and presented with a list of other functions provided by the present scale. By selecting "Check Limits" the user would be taken to step 620 and given a chance to check the weight and size limits of domestic and international carriers. By selecting "Tape Measure" the user is take to step 625 and scale will turn into a functional tape measurer, allowing user to measure the dimensions of his luggage. If the user selects "DwnLd/UpLd" the scale's GUI takes the user to step 630 and the user is given the option to download information from the Internet, or upload information to the Internet.

The foregoing description of the specific embodiments will so fully reveal the general nature of the invention that others can, by applying current knowledge, readily modify and/or adapt for various applications such specific embodiments without departing from the generic concept. For example, the shape of the handle of the scale in the preferred embodiment does not have to be cylindrical and could take other shapes, including a more ergonomic shape. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A portable, multi-function scale that is adapted for weighing a suitcase and other objects, the multi-function scale allowing a traveler to calculate separate and total weights of his luggage prior to traveling and also allowing the traveler to compare the calculated weights to weight limits of multiple common carriers, including airlines, the scale comprising:
    electronic circuitry capable sending, receiving, processing and storing weight and size information;
    a display screen for displaying selected weight and size information to the traveler, wherein the display screen is electrically connected to the electronic circuitry;
    at least one control button that allows the traveler to use the multi-functions of the scale, wherein the at least one control button is also electrically connected to the electronic circuitry;
    means for communicating with another electronic device;
    at least one battery that is electrically connected to the electronic circuitry; and,
    an easy to grip handle that is rotate-ably attached to a side of the scale, wherein a hook is attached to the handle, and the hook is adapted to fit inside a suitcase handle thereby allowing the suitcase to be picked up via the hook and the easy to grip handle and allowing a weight of the suitcase to be calculated.

2. The multi-function scale of claim 1, wherein the hook has a length that allows the hook to hang down from the handle and the hook includes at least one hinge that allows the hook to be folded lengthwise so the scale can achieve a compact size for storage.

3. The multi-function scale of claim 1, further comprising a measuring wheel that is rotate-ably attached to the scale, the measuring wheel being able to roll along a length of the suitcase and determine distance information, wherein the measuring wheel is electrically connected to the electronic circuitry and able to send the distance information to the electronic circuitry.

4. The multi-function scale of claim 1, wherein the at least one battery is stored in an interior of the handle.

5. The multi-function scale of claim 1, further comprising an "S" shaped hook, wherein a top of the "S" shaped hook is adapted to be hung over a support, including a door and a table, and a bottom of the "S" shaped hook is able to accept and support the handle of the scale, so that weights can be calculated without the traveler having to support the objects being weighed.

6. The multi-function scale of claim 1, wherein the scale is housed within a handle of the suitcase.

7. The multi-function scale of claim 1, wherein the hook has a width of at least two inches, the width of the hook providing stability to the suitcase, or other object, being weighed.

* * * * *